United States Patent
Yang

(10) Patent No.: US 12,096,303 B2
(45) Date of Patent: Sep. 17, 2024

(54) METHOD AND DEVICE FOR INFORMATION REPORTING, USER EQUIPMENT, AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 412 days.

(21) Appl. No.: 17/548,466

(22) Filed: Dec. 10, 2021

(65) Prior Publication Data
US 2022/0104099 A1 Mar. 31, 2022

Related U.S. Application Data

(63) Continuation of application No. PCT/CN2019/096606, filed on Jul. 18, 2019.

(51) Int. Cl.
*H04W 36/30* (2009.01)
*H04L 5/00* (2006.01)
(Continued)

(52) U.S. Cl.
CPC ......... *H04W 36/305* (2018.08); *H04L 5/0051* (2013.01); *H04W 36/0058* (2018.08);
(Continued)

(58) Field of Classification Search
CPC ........... H04W 36/305; H04W 36/0058; H04W 36/0072; H04W 52/367; H04W 76/19;
(Continued)

(56) References Cited

U.S. PATENT DOCUMENTS

| 2020/0314711 A1* | 10/2020 | Basu Mallick | H04W 36/08 |
| 2021/0218462 A1* | 7/2021 | Shi | H04B 7/0626 |
| 2022/0104300 A1* | 3/2022 | Ramachandra | H04B 7/0695 |

FOREIGN PATENT DOCUMENTS

| CN | 103220716 A | 7/2013 |
| CN | 108924929 A | 11/2018 |
| CN | 109392186 A | 2/2019 |

OTHER PUBLICATIONS

Mediatek 3GPP TSG RAN WG2 Meeting #101bis R2-1804612 RLF repoort in NR Apr. 2018 (Year: 2018).*
(Continued)

*Primary Examiner* — Rina C Pancholi
(74) *Attorney, Agent, or Firm* — Young Basile Hanlon & MacFarlane, P.C.

(57) ABSTRACT

A method for information reporting, a UE, and a network device are provided. The method includes the following. A UE transmits first information to a network device, where the first information includes at least one of: information associated with a first dedicated resource, or information associated with a first common resource. The first dedicated resource is a dedicated resource with which the UE executes a first event, and the first common resource is a common resource with which the UE executes the first event, the first event includes one of: a target cell access event during handover and a beam failure recovery event.

16 Claims, 7 Drawing Sheets

---

801

TRANSMIT FIRST INFORMATION TO A NETWORK DEVICE BY A UE, AND RECEIVE THE FIRST INFORMATION FROM THE UE BY THE NETWORK DEVICE, WHERE THE FIRST INFORMATION INCLUDES AT LEAST ONE OF: INFORMATION ASSOCIATED WITH A FIRST DEDICATED RESOURCE, OR INFORMATION ASSOCIATED WITH A FIRST COMMON RESOURCE. THE FIRST DEDICATED RESOURCE IS A DEDICATED RESOURCE WITH WHICH THE UE EXECUTES A FIRST EVENT, AND THE FIRST COMMON RESOURCE IS A COMMON RESOURCE WITH WHICH THE UE EXECUTES THE FIRST EVENT

(51) Int. Cl.
*H04W 36/00* (2009.01)
*H04W 52/36* (2009.01)
*H04W 76/19* (2018.01)

(52) U.S. Cl.
CPC ..... *H04W 36/0072* (2013.01); *H04W 52/367* (2013.01); *H04W 76/19* (2018.02)

(58) Field of Classification Search
CPC .... H04W 24/08; H04W 24/10; H04L 5/0051; H04B 17/17; H04B 17/382; H04B 17/24
See application file for complete search history.

(56) References Cited

OTHER PUBLICATIONS

3GPP TS 37.320 V16.5.0, Evolved Universal Terrestrial Radio Access (E-UTRA) and Next Generation Radio Access, Radio measurement collection for Minimization of Drive Tests(MDT);Overall description; Stage 2 (Release 16), Jun. 2021. (34 pages).
3GPP TSG RAN WG2 Meeting #101bis Sanya, China, Mediatek Inc, RLF Report in NR, R2-1804612, Apr. 16-20, 2018. (4 pages).
International Search Report with English Translation for PCT Application PCT/CN2019/096606 mailed Apr. 9, 2020. (15 pages).

\* cited by examiner

TRANSMIT FIRST INFORMATION TO A NETWORK DEVICE BY A UE, AND RECEIVE THE FIRST INFORMATION FROM THE UE BY THE NETWORK DEVICE, WHERE THE FIRST INFORMATION INCLUDES AT LEAST ONE OF: INFORMATION ASSOCIATED WITH A FIRST DEDICATED RESOURCE, OR INFORMATION ASSOCIATED WITH A FIRST COMMON RESOURCE. THE FIRST DEDICATED RESOURCE IS A DEDICATED RESOURCE WITH WHICH THE UE EXECUTES A FIRST EVENT, AND THE FIRST COMMON RESOURCE IS A COMMON RESOURCE WITH WHICH THE UE EXECUTES THE FIRST EVENT

FIG. 8

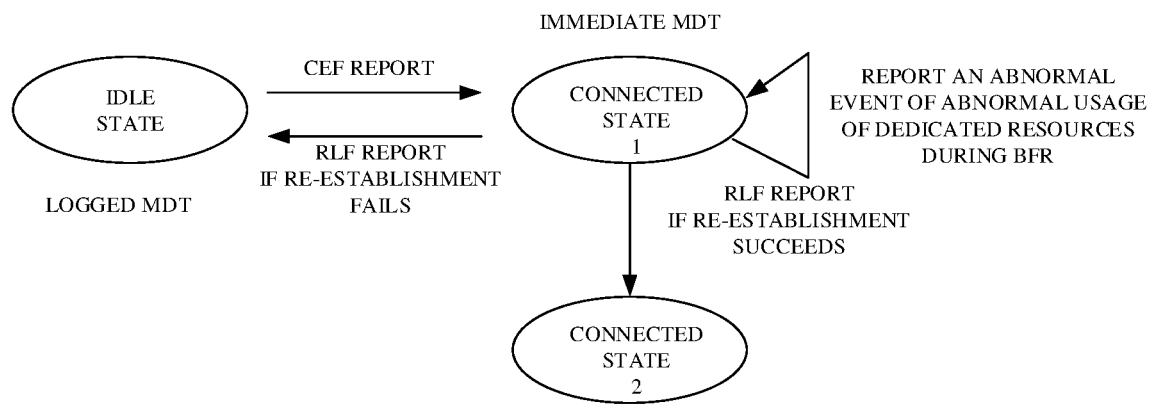

FIG. 9A

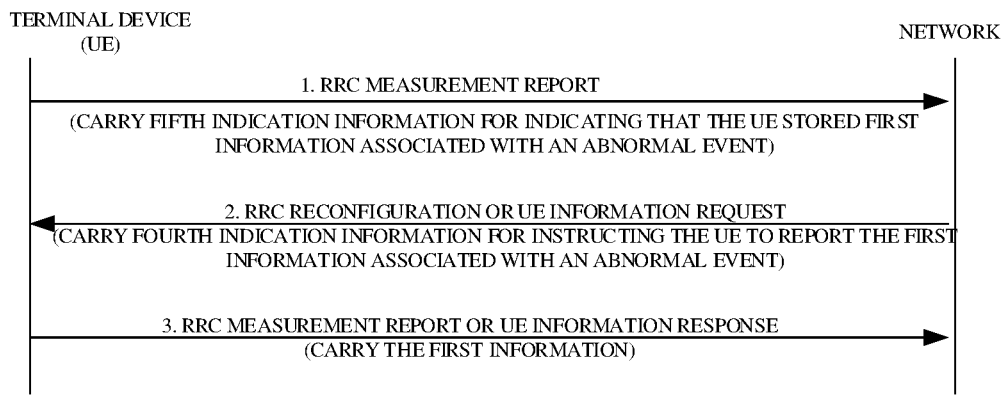

METHOD AND DEVICE FOR INFORMATION REPORTING, USER EQUIPMENT, AND NETWORK DEVICE

CROSS-REFERENCE TO RELATED APPLICATION(S)

This application is a continuation of International Application No. PCT/CN2019/096606, filed on Jul. 18, 2019, the disclosure of which is hereby incorporated by reference in its entirety.

TECHNICAL FIELD

This disclosure relates to the field of mobile communication technology, and particularly relates to a method and a device for information reporting, a user equipment, and a network device.

BACKGROUND

Generally, it is an abnormal event that a terminal device fails to use a dedicated resource for beam failure recovery (BFR) but succeeds in using a common resource for BFR. On the other hand, in a handover scenario, it is an abnormal event that a terminal device fails to use a dedicated resource for target cell random access but succeeds in using a common resource for target cell random access.

SUMMARY

Disclosed herein are implementations of a method and a device for information reporting, a user equipment (UE), and a network device.

According to a first aspect, a method for information reporting includes: a UE transmits first information to a network device, where the first information includes at least one of: information associated with a first dedicated resource, or information associated with a first common resource. The first dedicated resource is a dedicated resource with which the UE executes a first event, and the first common resource is a common resource with which the UE executes the first event.

According to a second aspect, a method for information reporting includes: a network device receives first information from a UE, where the first information includes at least one of: information associated with a first dedicated resource, or information associated with a first common resource. The first dedicated resource is a dedicated resource with which the UE executes a first event, and the first common resource is a common resource with which the UE executes the first event.

According to a third aspect, a device for information reporting includes: a transmitting unit configured to transmit first information to a network device, where the first information includes at least one of: information associated with a first dedicated resource, or information associated with a first common resource. The first dedicated resource is a dedicated resource with which the UE executes a first event, and the first common resource is a common resource with which the UE executes the first event.

According to a fourth aspect, a device for information reporting includes: a receiving unit configured to receive first information from a UE, where the first information includes at least one of: information associated with a first dedicated resource, or information associated with a first common resource. The first dedicated resource is a dedicated resource with which the UE executes a first event, and the first common resource is a common resource with which the UE executes the first event.

According to a fifth aspect, a UE includes a transceiver, a memory and a processor. The memory is configured to store computer programs. The processor is configured to invoke and run the computer programs stored in the memory to cause the transceiver to execute the method for information reporting according to the first aspect.

According to a sixth aspect, a network device includes a transceiver, a memory and a processor. The memory is configured to store computer programs. The processor is configured to invoke and run the computer programs stored in the memory to cause the transceiver to execute the method for information reporting according to the second aspect.

According to a seventh aspect, a chip is configured to implement the method for information reporting. The chip includes a processor, and the processor is configured to invoke and run computer programs stored in a memory to make a device equipped with the chip to execute the method for information reporting.

According to an eighth aspect, a computer readable storage medium is configured to store computer programs which make a computer to execute the method for information reporting.

According to a tenth aspect, a computer program product includes computer program instructions which make a computer to execute the method for information reporting.

According to an eleventh aspect, a computer program makes a computer to execute the method for information reporting when running on the computer.

BRIEF DESCRIPTION OF DRAWINGS

The drawings described herein are intended to provide a further understanding of the disclosure and form a part of the disclosure. The implementations of the disclosure and their descriptions are used to explain the disclosure and do not constitute any improper limitation of the disclosure.

FIG. 8 is a schematic flowchart illustrating a method for information reporting according to implementations.

FIG. 9A is a schematic diagram illustrating a reporting scenario of a beam failure recovery event according to implementations.

FIG. 9B is a schematic flowchart illustrating a reporting procedure of a beam failure recovery event according to implementations.

DETAILED DESCRIPTION

Technical solutions in implementations of the disclosure will be described below in combination with the accompanying drawings. Obviously, the described implementations are part rather than all of the implementations. Based on the implementations provided herein, all other implementations obtained by those of ordinary skill in the art without making creative work belong to the protection scope of the disclosure.

The technical solutions of implementations are applicable to various communication systems, for example, a global system of mobile communication (GSM), a code division multiple access (CDMA) system, a wideband code division multiple access (WCDMA) system, a general packet radio service(GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a 5th generation mobile communication technology (5G) system.

Figure 1:
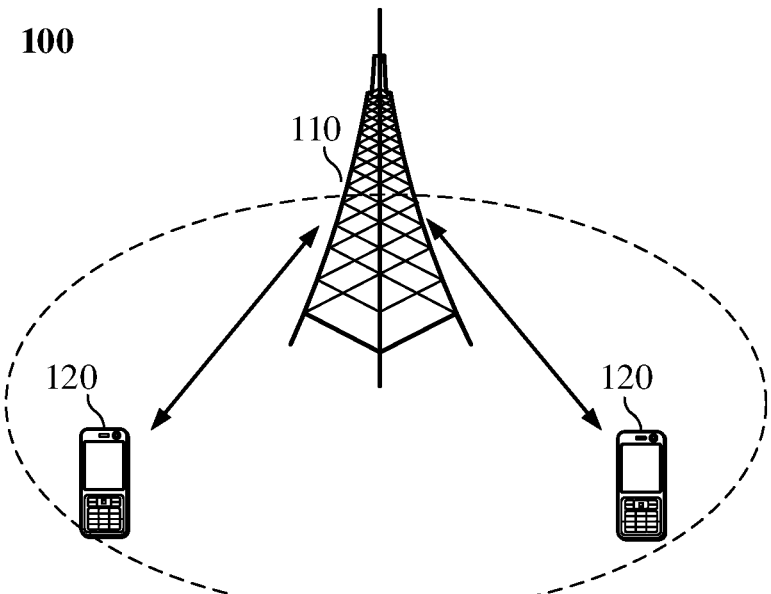
FIG. 1 is a schematic diagram illustrating a communication system architecture according to implementations.

A communication system 100 adopted in implementations is illustrated in FIG. 1. The communication system 100 includes a network device 110, which can be a device in communication with a terminal device 120 (also known as a communication terminal, or a terminal). The network device 110 can provide communication coverage for a specific geographical area and may communicate with terminal devices located within the coverage area. The network device 110 may be, for example, a base transceiver station (BTS) in the GSM or in the CDMA system, a Node B (NB) in the WCDMA system, an evolutional Node B (eNB or eNodeB) in the LTE system, or a radio controller in a cloud radio access network (CRAN). Alternatively, the network device 110 may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 may further include at least one terminal device 120 located within the coverage range of the network device 110. The "terminal device" referred to herein includes, but not limited to a device configured to communicate via a wired line, another data connection/network, a wireless interface, a device which is part of another terminal device and configured to receive/transmit communication signals, and/or an Internet of things (IoT) device. Examples of the wired line may include, but not limited to, a public switched telephone network (PSTN), a digital subscriber line (DSL), a digital cable, and a direct connection cable. Examples of the wireless interface may include, but not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of the mobile terminal may include, but not limited to, a satellite telephone or a cellular telephone, a personal communication system (PCS) terminal integrated with functions of cellular radio telephone, data processing, fax, and/or data communication, a personal digital assistant (PDA) equipped with radio telephone, pager, internet/intranet access, web browsing, notebook, calendar, and/or global positioning system (GPS) receiver, and/or a conventional laptop, a handheld receiver, or other electronic devices equipped with radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

As an example, terminals devices 120 can communicate with each other through device to device (D2D) communication.

As an example, the 5G system or the 5G network can also be referred to as a new radio (NR) system or an NR network.

FIG. 1 exemplarily illustrates one network device and two terminal devices. The communication system 100 may also include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

It should be understood that, a device with communication functions in a network/system of implementations can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In order to understand the technical solution of the implementations, relevant technologies related to the implementations are described below.

In cellular networks (such as LTE and NR), the terminal device such as a user equipment (UE) operates according to a network configuration no matter in an idle state (IDLE), an inactive state (INACTIVE) or a connected state (CONNECTED). For example, when the UE is IDLE, the UE performs cell selection and cell re-selection according to the network configuration. When the UE is INACTIVE, the UE performs RAN notification area (RNA) update according to the network configuration. When the UE is CONNECTED, the UE performs bearer establishment, data transmission, and cell handover according to the network configuration.

Among operations of the UE, one kind of reporting belongs to the reporting for UE assisted network optimization, where the main reason is that in the current wireless network, due to the large number of network parameters, there will be problems in the process of network parameter configuration, such as complex parameter configuration, difficult coordination of some parameters, or easy mismatch. Therefore, in the research of LTE and NR, a concept of self-optimized network (SON) is proposed. It is desirable that the network can automatically plan and optimize the network parameter based on the parameter reported by the terminal device and statistical information of the network.

For assistance of parameter optimization of the network, a minimization of drive test (MDT) report, a radio link failure (RLF) report, a connection establishment failure (CEF) report, and the like are introduced, which can achieve information reporting in different scenarios to assist the network to identify the problem and optimize the network through parameter adjustment.

The MDT report focuses on collecting information from both a base station and the UE in terms of coverage problems such as network coverage holes, weak coverage, pilot pollution, over coverage, coverage overlap, uplink coverage, etc., so as to identify the problem and adjust the network parameter to optimize the network configuration. Information reported by the UE mainly includes reference signal receiving power (RSRP) value of a cell, reference signal receiving quality (RSRQ) value of a cell, RSRP/RSRQ value of a beam, location information of a beam, and time information of a beam. MDT report includes Immediate MDT report and Logged MDT report. In LTE system, the Immediate MDT report is basically the same as common a radio resource management (RRM) report, and the difference lies in that compared with the RRM report, the location information is reported in the Immediate MDT report.

Logged MDT report is described below.

The RLF report focuses on reporting problems related to radio link failure and handover failure, such that the network can identify the reason for radio link failure and handover failure and optimize the network parameter. The information reported mainly includes RSRP/RSRQ value, location information, and other information of a serving cell.

The CEF report focuses on reporting problems related to connection establishment failure, such that the network can identify the reason for connection establishment failure and optimize terminal access. The information reported mainly includes cell ID of a failed cell, RSRP/RSRQ value of a serving cell, location information of a serving cell, a timestamp, number of random access preambles attempted, maximum transmission power and so on.

Figure 2:
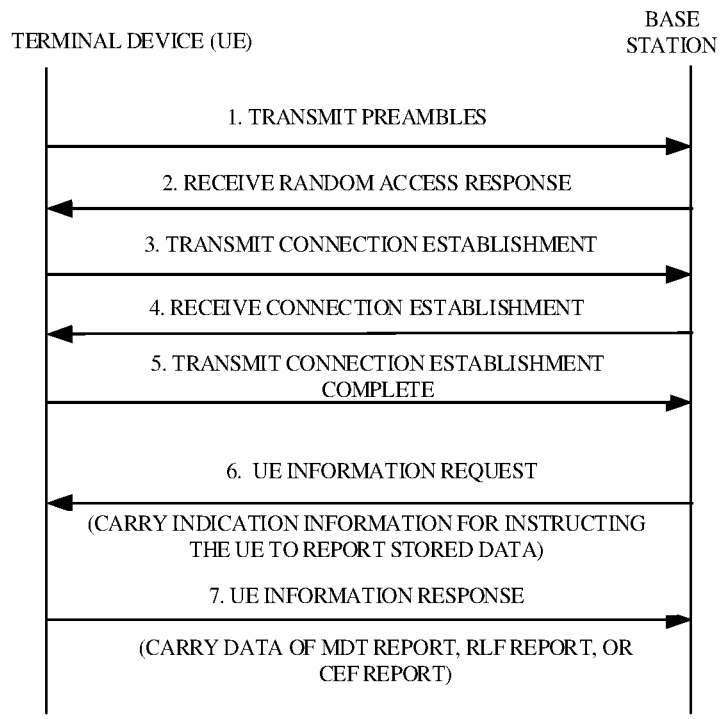
FIG. 2 is a schematic flowchart illustrating a reporting procedure according to implementations.

The Logged MDT report, the RLF report, and the CEF report are similar in procedure, which are illustrated in FIG. 2. As illustrated in FIG. 2, a UE carries indication information in a connection establishment complete message (in LTE protocols, RRCConnectionEstablishmentComplete), where the indication information indicates that the UE stored data of the Logged MDT report, the RLF report, or the CEF report. After receiving the message, a network sends a UE information request massage (UEInformationRequest) to notify the UE to report the data stored, and the UE will send back a UE information response message (UEInformationResponse) to report the data stored.

Figure 3:
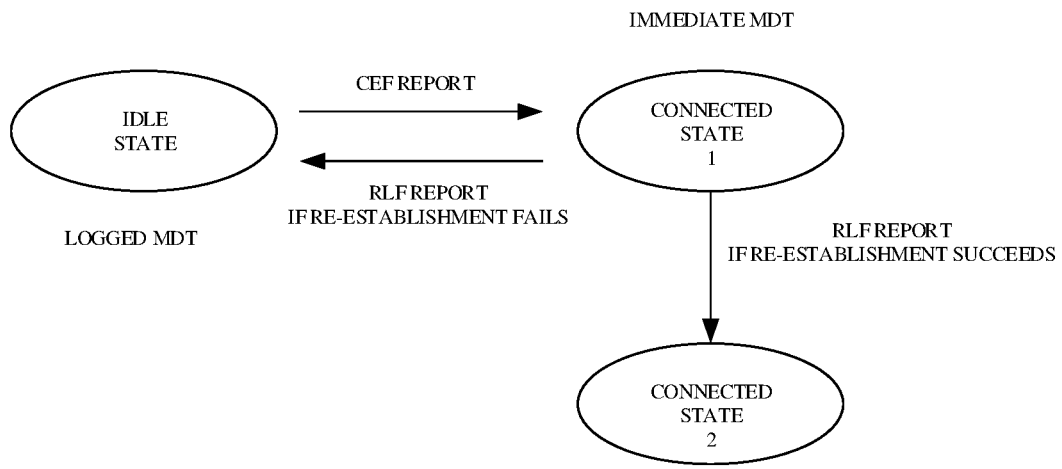
FIG. 3 is a schematic diagram illustrating a reporting scenario according to implementations.

FIG. 3 illustrates scenarios for the above reports. The Logged MDT report is mainly for network measurement of a UE in the idle state. The Immediate MDT is mainly for network measurement of a UE in the connected state, and for reporting successful beam failure recovery (BFR)/successful handover of the UE. The CEF report is mainly for recording abnormal events during terminal access. The RFL report is mainly for recording abnormal events when radio link failure or handover failure (including failed reestablishment after failure and successful reestablishment after failure) occurs.

Figure 4:
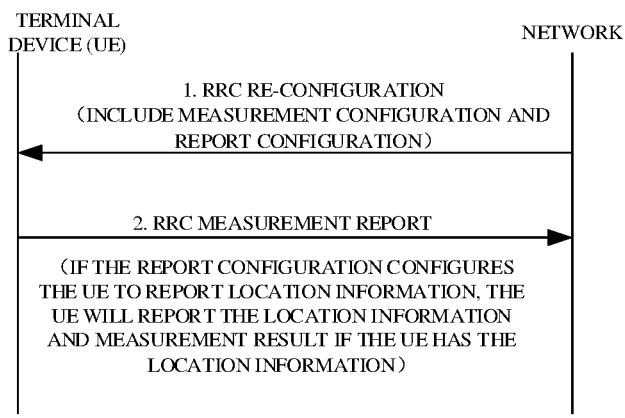
FIG. 4 is another schematic flowchart illustrating a reporting procedure according to implementations.

As mentioned above, the Immediate MDT report is mainly for a UE in a connected state, and a manner of the Immediate MDT report is basically the same as an ordinary RRM report, which is illustrated in FIG. 4. A network configures the UE to conduct measurement and report through a reconfiguration message (MeasConfig for measurement and ReportConfig for report). In ReportConfig, the network will notify the UE whether to report location information. If the location information is required to be reported, then such report is an Immediate MDT report, otherwise, it is an ordinary RRM measurement report. The UE will report the location information if the UE has the location information during reporting. Therefore, a measurement report of abnormal events regarding the connected state can be completed through the Immediate MDT report.

In the NR discussion, because a concept of "beam" is introduced, a link between the network and the UE is more dynamic, and the UE may need to dynamically select among multiple beams and therefore, there may be the possibility of beam failure detection (BFD) at any time. Considering this, BFR is provided.

Figure 5:
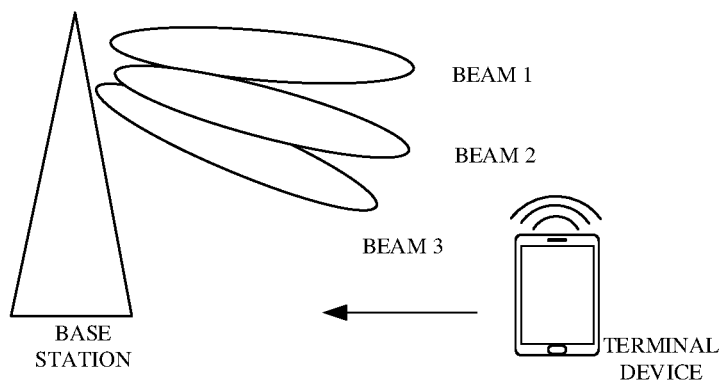
FIG. 5 is a schematic diagram illustrating a beam according to implementations.

As illustrated in FIG. 5, during the movement of a UE, the UE keeps moving between beam 1, beam 2 and beam 3, which may lead to BFD and then beam recovery is performed through BFR.

For beam failure scenarios, a network will allocate a dedicated resource(s) for BFR. In addition, a common resource(s) allocated by the network (i.e. competitive resources) can also be used for BFR. Configuration information of the dedicated resource for BFR allocated by the network is transmitted to the UE through IE (BeamFailureRecoveryConfig) in a reconfiguration message. BeamFailureRecoveryConfig is used for configuration of a random access channel (RACH) resource(s) and a candidate beam(s).

During BFR, if all dedicated resources fail to meet requirements, the UE will use the common resource for the BFR, and if beam recovery succeeds, the UE will remain in a connected state.

Figure 6:
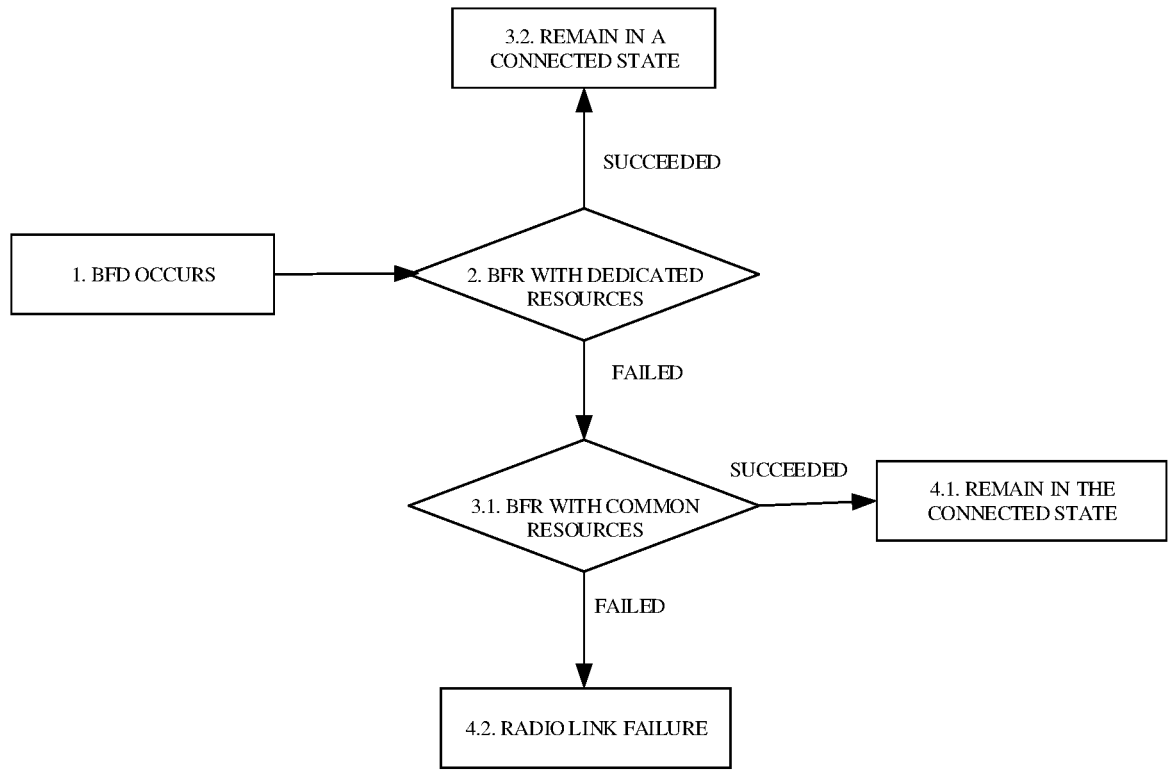
FIG. 6 is a schematic flowchart illustrating beam failure recovery according to implementations.

That is to say, when BFD occurs, if the UE succeeds in performing BFR with the dedicated resource, the UE remains in the connected state without any reestablishment. If the UE fails to perform BFR with the dedicated resource but succeeds in performing BFR with the common resource, the UE remains in the connected state without any reestablishment. Only when BFD occurs and BFR with the dedicated resource and BFR with the common resource all fail, will the UE declare that random access failure occurred, and proceed to radio link failure to trigger RRC reestablishment, as illustrated in FIG. 6.

If BFR with the dedicated resource succeeds, it meets the expected effect of the system, proves that the configuration is accurate, and is a normal event, so no report is needed. If BFR with the dedicated resource and BFR with the common resource all fail, radio link failure occurs, such abnormal situation will be reported through a corresponding RLF report. However, if the BFR with the dedicated resource fails but the BFR with the common resource succeeds, there is currently no way to record such abnormal event.

Figure 7:
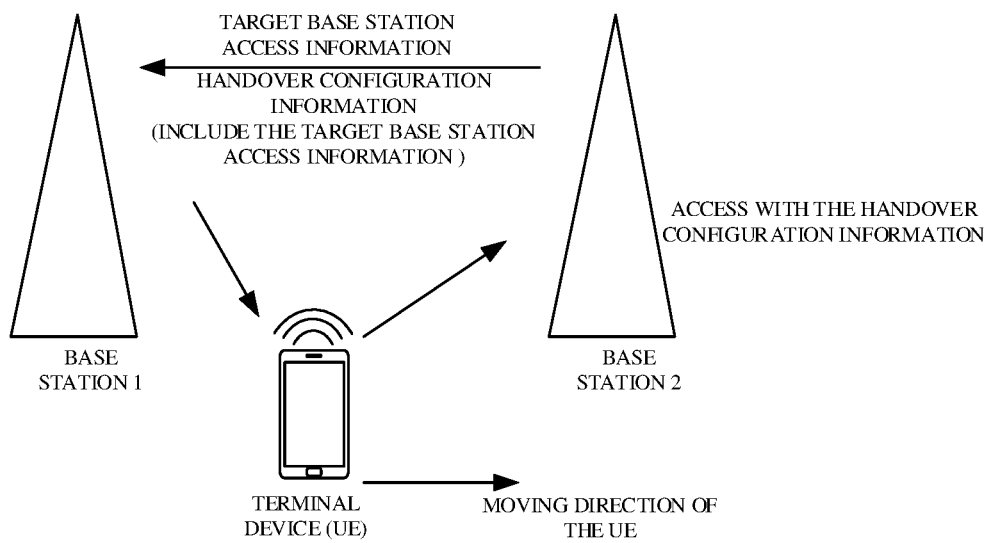
FIG. 7 is a schematic diagram illustrating a handover procedure according to implementations.

Similar to BFD and BFR, during handover of a UE, handover failure and handover failure recovery may also occur. In the NR network, two set random access resources (including a common resource(s) and a dedicated resource(s)) are configured for the UE. When the UE fails to access a target cell with the dedicated resource, the UE will attempt to access the target cell with the common resource to avoid handover failure, as illustrated in FIG. 7.

During handover, target base station access information is carried in a handover request acknowledge message to be sent to an original cell, and then carried in a reconfiguration message (RRCReconfiguration) to be sent from the original cell to the UE. The target base station access information includes but not limited to one or more of the following: target cell ID, new cell-radio network temporary identifier (C-RNTI), a set of dedicated RACH resources, association between dedicated RACH resources and a synchronization signal (SS) physical broadcast channel (PBCH) block (SSB) and/or a channel state information reference signal (CSI-RS), common RACH resources, system information of a target cell, and so on.

RACH resources mainly include: (i) the common RACH resource; (ii) the common RACH resource and the dedicated RACH resource, where the dedicated RACH resource is associated with the SSB; (iii) the common RACH resource and the dedicated RACH resource, where the dedicated RACH resource is associated with the CSI-RS.

The RACH resource is used according to the following rules: if the dedicated RACH resource meets a threshold value or a timer for dedicated resource attempt has not expired, the UE continues to use the dedicated resource for access; if all dedicated RACH resources cannot meet the threshold value or the timer for dedicated resource attempt has expired, the UE can use the common RACH resource for access.

If the network configures the dedicated resource for the UE, the UE is expected to access the target cell successfully with the dedicated resource, however, the UE accesses the target cell successfully with a candidate common resource rather than with the dedicated resource. This is an abnormal event during handover. Such abnormal event, although does not cause handover failure, leads to an extended handover interrupt and therefore, needs to be recorded and fed back to the network, such that the network can optimize the dedicated resource to avoid such abnormal event.

Based on the above, a mechanism for reporting abnormal events is provided, in which the UE can report the following abnormal event when the UE is in a connected state: BFR or target cell access during handover is successful with a common resource.

FIG. 8 is a schematic flowchart illustrating a method for information reporting. The method is applicable to a terminal device such as UE. The terminal device however does not limit to the UE and can also be other terminals, as described before. As illustrated in FIG. 8, the method begins at block 801.

At block 801, a UE transmits first information to a network device, and the network device receives the first information from the UE, where the first information includes at least one of: information associated with a first dedicated resource, or information associated with a first common resource. The first dedicated resource is a dedicated resource with which the UE executes a first event, and the first common resource is a common resource with which the UE executes the first event.

In one implementation, the network device may be a base station, such as a gNB or an eNB.

In one implementation, the first dedicated resource is a dedicated resource with which the UE has attempted to execute the first event. Optionally, the UE fails to execute the first event with the first dedicated resource.

In one implementation, the first common resource is a common resource with which the UE has attempted to execute the first event. Optionally, the UE succeeds in executing the first event with the first common resource.

In one implementation, the information associated with the first dedicated resource includes at least one of: information of a target cell that fails to execute the first event with the first dedicated resource; an index of a reference signal associated with the first dedicated information; number of preambles transmitted on a beam corresponding to the reference signal associated with the first dedicated resource; maximum transmission power on the beam corresponding to the reference signal associated with the first dedicated resource; signal quality of the reference signal associated with the first dedicated resource; first indication information indicative of whether the reference signal associated with the first dedicated resource belongs to an uplink carrier (UL) or a supplementary uplink carrier (SUL).

The signal quality includes at least one of: RSRP, RSRQ, or a signal to interference plus noise ratio (SINR).

The reference signal associated with the first dedicated resource includes at least one of: an SSB or a CSI-RS.

In one implementation, the information associated with the first common resource includes at least one of: information of a target cell that succeeds in executing the first event with the first common resource; an index of a reference signal associated with the first common resource; number of preambles transmitted on a beam corresponding to the reference signal associated with the first common resource; maximum transmission power on the beam corresponding to the reference signal associated with the first common resource; signal quality of the reference signal associated with the first common resource; or second indication information indicative of whether the reference signal associated with the first common resource belongs to an uplink carrier or a supplementary uplink carrier.

The signal quality includes at least one of: RSRP, RSRQ, or a SINR.

The reference signal associated with the first common resource includes an SSB.

In one implementation, the first information further includes: third indication information indicative of number of occurrences of a second event, where the second event means that the UE fails to execute the first event with a dedicated resource and succeeds in executing the first event with a common resource.

At least one of the first indication information, the second indication information, and the third indication information is carried in the first information by the UE on condition that number of occurrences of the second event is greater than or equal to a first threshold.

The number of occurrences of the second event may refer to number of occurrences of the second event in the same cell, or refer to the total number of occurrences of the second event in different cells (such as more than two cells) recorded by the UE.

In one implementation, the first event is a BFR event. In another implementation, the first event is a target cell access event during handover. The BFR event and the target cell access event during handover will be detailed below respectively.

BFR event

For the BFR event, if BFR with a dedicated resource succeeds, it meets the expected effect of the system, proves that the configuration is accurate, and belongs to a normal event, so no recording and report is needed. If BFR with a dedicated resource and BFR with a common resource all fail and radio link failure occurs, such abnormal situation will be reported through a corresponding RLF report. It is an abnormal event that a UE fails to perform BFR with the dedicated resource but succeeds in performing BFR with the common resource. Such abnormal event should be recorded because when BFD occurs, under a reasonable circumstance, the UE can perform BFR successfully with the dedicated resource (that is, a resource dedicated for BFR) to make sure that the UE is in a connected state. However, the UE has to use the common resource for BFR due to failure of the dedicated resource, which is an abnormal event. As illustrated in FIG. 9A, the UE has to report the abnormal event of abnormal usage of the dedicated resource during BFR. For example, when BFR with the first dedicated resource fails but BFR with the first common resource succeeds, the UE has to record at least one of: information associated with the first dedicated resource, and information associated with the first common resource.

In one implementation, the information associated with the first dedicated resource includes at least one of: information of a target cell that fails to execute the first event with the first dedicated resource, such as cell ID, cell frequency and physical cell ID; an index of a reference signal associated with the first dedicated information, such as an index of an SSB and/or a CSI-RS associated with a dedicated resource(s) attempted by the terminal; number of preambles transmitted on a beam corresponding to the reference signal associated with the first dedicated resource, such as number of preambles transmitted on a beam corresponding to the SSB and/or the CSI-RS associated with the dedicated resource attempted by the UE; maximum transmission power on the beam corresponding to the reference signal associated with the first dedicated resource, such as maximum transmission power on the beam corresponding to the SSB and/or the CSI-RS associated with the dedicated resource attempted by the UE; signal quality of the reference signal associated with the first dedicated resource, such as at least one of RSRP, RSRQ, and a SINR of the SSB and/or the CSI-RS associated with the dedicated resource attempted by the UE; first indication information indicative of whether the reference signal associated with the first dedicated resource belongs to an uplink carrier or a supplementary uplink carrier, for example, the first indication information is indicative of whether the SSB and/or the CSI-RS associated with the dedicated resource attempted by the UE belongs to an uplink carrier (UL) or a supplementary uplink carrier (SUL).

In one implementation, the information associated with the first common resource includes at least one of: information of a target cell that succeeds in executing the first event with the first common resource, such as cell ID, cell frequency and physical cell ID; an index of a reference signal associated with the first common resource, such as an index of an SSB associated with a common resource with which the first event is executed successfully (in the following, "successful common resource" for short); number of preambles transmitted on a beam corresponding to the reference signal associated with the first common resource, such as number of preambles transmitted on a beam corresponding to an SSB associated with the successful common resource; maximum transmission power on the beam corresponding to the reference signal associated with the first common resource, such as maximum transmission power on the beam corresponding to the SSB associated with the successful common resource; signal quality of the reference signal associated with the first common resource, such as at least one of RSRP, RSRQ, and a SINR of the SSB associated with the successful common resource; second indication information indicative of whether the reference signal associated with the first common resource belongs to an UL or a SUL, for example, the second indication information is indicative of whether the SSB associated with the successful common resource belongs to the UL or the SUL.

Some conditions can be set for recording of the first information. For example, the UE will record only when the number of occurrences of the following event in the same cell exceeds a threshold: BFR with the dedicated resource fails but BFR with the common resource succeeds.

In one implementation, the UE transmits the first information to the network device in at least one of the following manners.

(1) The network device transmits a RRC reconfiguration message or a request message about related UE information (in the following, UE information request message) to the UE, and the UE receives the RRC reconfiguration message or the UE information request message from the network device. The RRC reconfiguration message or the UE information request message carries fourth indication information which is used for instructing the UE to report the first information.

(2) The UE transmits a measurement report message or a UE information response message to the network device, and the network device receives the measurement report message or the UE information response message from the UE. The measurement report message or the UE information response message carries the first information.

In one implementation, before receiving the RRC reconfiguration message or the UE information request message form the network device, the method further includes: (0) the UE transmits fifth indication information to the network device, and the network device receives the fifth indication information from the UE, where the fifth indication information is for indicating that the UE stored the first information.

In one implementation, the fourth indication information is further indicative of a first threshold, on condition that the number of occurrences of the second event is greater than the first threshold, the UE carries the first information in the measurement report message or the UE information response message. The second event refers to that the UE fails to execute the first event with the dedicated resource but succeeds in executing the first event with the common resource.

For example, the first information can be reported in a manner similar to that of the Logged MDT report, the RLF report, and the CEF report. As illustrated in FIG. 9B, in the connected state, (1) the UE transmits UE assistance information (UE Assistance Info) or a RRC measurement report message (Measurement Report) to the network, where the UE assistance information or the RRC measurement report message carries the fifth indication information for indicating that the UE stored first information associated with an abnormal event. (2) If the network wants the first information, the network can transmit to the UE the RRC reconfiguration message or the UE information request message, which carries the fourth indication information, where the fourth indication information is for instructing the terminal to report the first information associated with an abnormal event. (3) The UE can transmit the first information to the network by carrying the first information in the next RRC measurement report message or terminal information response message.

Figure 9C:
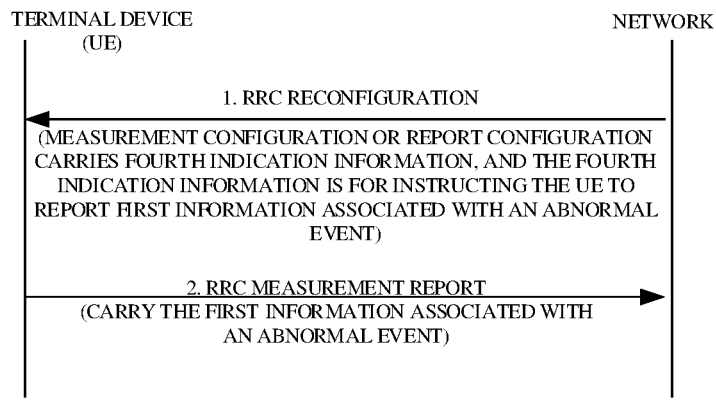
FIG. 9C is an another schematic flowchart illustrating a reporting procedure of a beam failure recovery event according to implementations.

For example, the UE can report the first information to the network in a pre-configured manner. For example, as illustrated in FIG. 9C, in the connected state, (1) the network device transmits the RRC reconfiguration message to the UE, where measurement configuration or report configuration in the RRC reconfiguration message carries the fourth indication information, and the fourth indication information is for instructing the UE to report first information associated with an abnormal event. (2) On condition that BFR with the dedicated resource fails but BFR with the common resource succeeds, the UE can transmit the first information to the network by carrying the first information in the next RRC measurement report message.

For example, the network can set a threshold for first information reporting. If the number of occurrence of the abnormal event in the same cell or under the same configuration exceeds the threshold N (for example N=3), the UE reports the first information.

Here, the first information is used for the network device to reconfigure at least one of the following parameters of the first dedicated resource: a reference signal (such as an SSB and/or a CSI-RS) associated with the first dedicated resource; threshold information corresponding to the reference signal associated with the first dedicated resource (for example, a threshold for evaluating whether the SSB and/or the CSI-RS can be used for BFR); number of preambles transmitted on a beam corresponding to the reference signal associated with the first dedicated resource; maximum transmission power on the beam corresponding to the reference signal associated with the first dedicated resource; number of reference signals (such as an SSB and/or a CSI-RS) associated with a RACH occasion of the first dedicated resource; or a timer associated with the first event (such as a timer for limiting BFR).

The SSB and/or the CSI-RS will be reconfigured because the previous SSB and/or CSI-RS is not properly configured and leads to BFR failure.

The threshold for limiting BFR with the reference signal is reconfigured because the previous threshold may be too high and therefore excludes the SSB and/or the CSI-RS which is available for BFR.

The maximum transmission power is reconfigured because the previous maximum transmission power may be too low and leads to BFR failure with the SSB and/or the CSI-RS.

The number of the SSB and/or the CSI-RS associated with the RACH occasion is reconfigured because the previous number of the SSB and/or the CSI-RS associated with the RACH occasion may be too small and therefore the UE is unable to select a suitable SSB and/or CSI-RS for BFR.

The timer for limiting BFR is reconfigured because previous duration of the timer may be too short and as a result, not too much SSB and/or CSI-RS configuration can be attempted by the UE, therefore, lead to BFR failure.

Therefore, the network device can reconfigure at least one of the following parameters of the first dedicated resource in the following manners: change the reference signal associated with the first dedicated resource; lower the threshold value or information corresponding to the reference signal associated with the first dedicated resource; increase the number of preambles transmitted on the beam corresponding to the reference signal associated with the first dedicated resource; increase the maximum transmission power on the beam corresponding to the reference signal associated with the first dedicated resource; increase the number of reference signals (such as the SSB and/or the CSI-RS) associated with the RACH occasion of the first dedicated resource; extend the timer associated with the first event (such as the timer for limiting the BFR).

According to implementations provided herein, for Immediate MDT scenarios, if BFD occurs to the UE and the beam is recovered through BFR and therefore does not lead to RLF, the UE will report the first information.

Target Cell Access Event

Figure 10A:
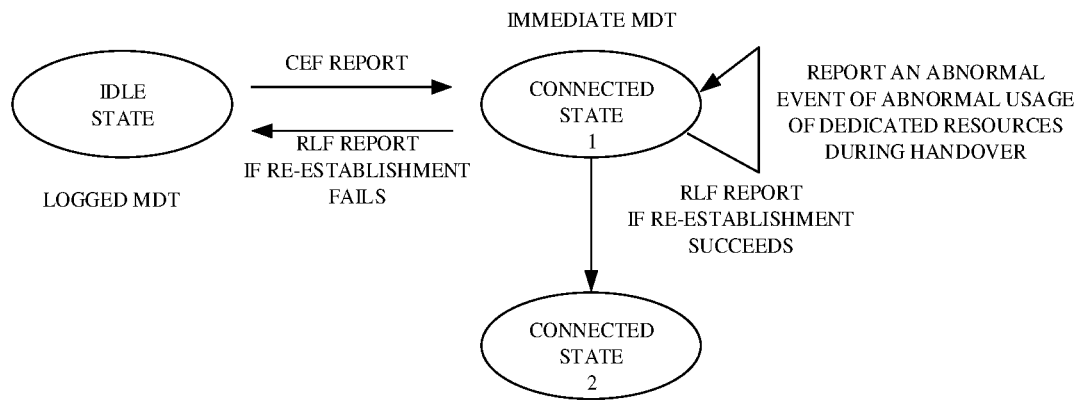
FIG. 10A is a schematic diagram illustrating a reporting scenario of a target cell access event according to implementations.

For the target cell access event, if BFR with a dedicated resource succeeds, it meets the expected effect of the system, proves that the configuration is accurate, and belongs to a normal event, so no recording and report is needed. If BFR with a dedicated resource and BFR with a common resource all fail, handover failure occurs, associated information will be recorded and network reconstruction will be conducted. It is an abnormal event that the UE fails to perform target cell access with the dedicated resource but succeeds in performing target cell access with the common resource. Such abnormal event should be recorded because, during handover, under a reasonable circumstance, the UE can perform target cell access successfully with the dedicated resource (that is, a resource dedicated for target cell access during handover) to make sure that the UE is in a connected state. However, due to failure of the dedicated resource, the UE has to use a candidate common resource for access to make sure successful handover, which is an abnormal event. As illustrated in FIG. 10A, the UE has to report the abnormal event of abnormal usage of the dedicated resource during handover. For example, when target cell access during handover with the first dedicated resource fails but target cell access during handover with the first common resource succeeds, the UE has to record at least one of: information associated with the first dedicated resource, and information associated with the first common resource.

The information associated with the first dedicated resource includes at least one of: information of a target cell that fails to execute the first event with the first dedicated resource, such as cell ID, cell frequency and physical cell ID; an index of a reference signal associated with the first dedicated information, such as an index of an SSB and/or a CSI-RS associated with a dedicated resource(s) attempted by the terminal; number of preambles transmitted on a beam corresponding to the reference signal associated with the first dedicated resource, such as number of preambles transmitted on a beam corresponding to the SSB and/or the CSI-RS associated with the dedicated resource attempted by the UE; maximum transmission power on the beam corresponding to the reference signal associated with the first dedicated resource, such as maximum transmission power on the beam corresponding to the SSB and/or the CSI-RS associated with the dedicated resource attempted by the UE; signal quality of the reference signal associated with the first dedicated resource, such as at least one of RSRP, RSRQ, and a SINR of the SSB and/or the CSI-RS associated with the dedicated resource attempted by the UE; first indication information indicative of whether the reference signal associated with the first dedicated resource belongs to an uplink carrier or a supplementary uplink carrier, for example, the first indication information is indicative of whether the SSB and/or the CSI-RS associated with the dedicated resource attempted by the UE belongs to an UL or a SUL.

In one implementation, the information associated with the first common resource includes at least one of: information of a target cell that succeeds in executing the first event with the first common resource, such as cell ID, cell frequency and physical cell ID; an index of a reference signal associated with the first common resource, such as an index of an SSB associated with a common resource with which the first event is executed successfully (in the following, "successful common resource" for short); number of preambles transmitted on a beam corresponding to the reference signal associated with the first common resource, such as number of preambles transmitted on a beam corresponding to an SSB associated with the successful common resource; maximum transmission power on the beam corresponding to the reference signal associated with the first common resource, such as maximum transmission power on the beam corresponding to the SSB associated with the successful common resource; signal quality of the reference signal associated with the first common resource, such as at least one of RSRP, RSRQ, and a SINR of the SSB associated with the successful common resource; second indication information indicative of whether the reference signal associated with the first common resource belongs to an UL or a SUL, for example, the second indication information is indicative of whether the SSB associated with the successful common resource belongs to the UL or the SUL.

Some conditions can be set for recording of the first information. For example, the UE will record only when the number of occurrences of the following event in the same cell exceeds a threshold: target cell access fails during handover with the dedicated resource fails but succeeds during handover with the common resource.

In one implementation, the UE transmits the first information to the network device in at least one of the following manners.

Manner 1: (1) the UE transmits a handover complete message to the network device, and the network device receives the handover complete message from the UE, where the handover complete message carries fifth indication information which is for indicating that the UE stored the first information; (2) the network device transmits a RRC reconfiguration message or a UE information request message to the UE, and the UE receives the RRC reconfiguration message or the UE information request message from the network device, where the RRC reconfiguration message or the UE information request message carries fourth indication information, and the fourth indication information is for instructing the UE to report the first information; (3) the UE transmits a measurement report message or a UE information response message to the network device, and the network device receives the measurement report message or the UE information response message from the UE, where the measurement report message or the UE information response message carries the first information.

Manner 2: The UE transmits a handover complete message to the network device, and the network device receives the handover complete message from the UE, where the handover complete message carries the first information.

Figure 10B:
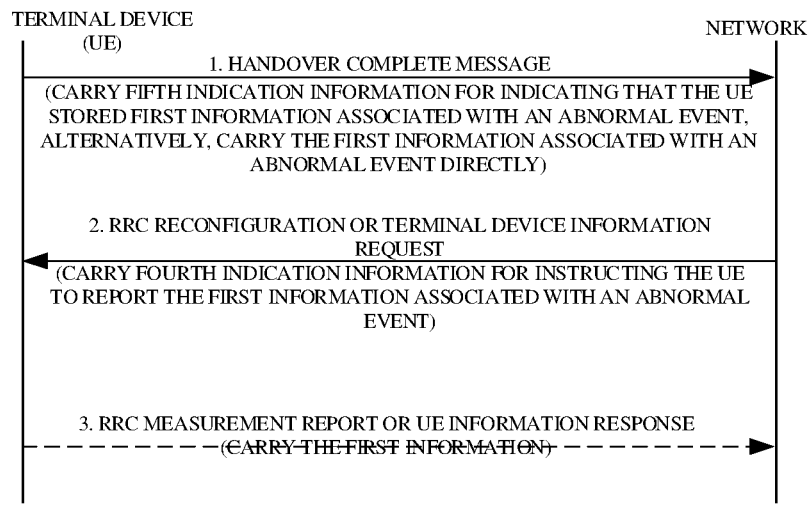
FIG. 10B is a schematic flowchart illustrating a reporting procedure of a target cell access event according to implementations.

For example, the first information can be reported in a manner similar to that of the Logged MDT report, the RLF report, and the CEF report. As illustrated in FIG. 10B, in the connected state, (1) the UE transmits a handover complete message (RRCReconfigurationComplete) to the network, where the handover complete message carries the fifth indication information for indicating that the UE stored the first information associated with an abnormal event, alternatively, the handover complete message carries the first information associated with an abnormal event directly. (2) If the handover complete message carries the fifth indication information and the network wants the first information, the network can transmit to the UE the RRC reconfiguration message or the UE information request message, which carries the fourth indication information, where the fourth indication information is for instructing the UE to report the first information associated with an abnormal event. (3) The UE can transmit the first information to the network by carrying the first information in the next RRC measurement report message or terminal information response message.

Here, the first information is used for the network device to reconfigure at least one of the following parameters of the first dedicated resource: a reference signal (such as an SSB and/or a CSI-RS) associated with the first dedicated resource; threshold information corresponding to the reference signal associated with the first dedicated resource (for example, a threshold for evaluating whether the SSB and/or the CSI-RS can be used for target cell access); number of preambles transmitted on a beam corresponding to the reference signal associated with the first dedicated resource; maximum transmission power on the beam corresponding to the reference signal associated with the first dedicated resource; number of reference signals (such as the SSB and/or the CSI-RS) associated with a RACH occasion of the first dedicated resource; or a timer associated with the first event (such as a timer for limiting target cell access).

The SSB and/or the CSI-RS is reconfigured because the previous SSB and/or CSI-RS is not properly configured and leads to target cell access failure.

The threshold for limiting target cell access with the reference signal is reconfigured because the previous threshold may be too high and therefore excludes the SSB and/or the CSI-RS which is available for target cell access.

The maximum transmission power is reconfigured because the previous maximum transmission power may be too low and leads to target cell access failure with the SSB and/or the CSI-RS during handover.

The number of the SSB and/or the CSI-RS associated with a RACH occasion is reconfigured because the previous number of the SSB and/or the CSI-RS associated with the RACH occasion may be too small and therefore the UE is unable to select a suitable SSB and/or CSI-RS for target cell access during handover.

The timer for limiting target cell access is reconfigured because previous duration of the timer may be too short and as a result, not too much SSB and/or CSI-RS configuration can be attempted by the UE, therefore, lead to target cell access failure.

Therefore, the network device can reconfigure at least one of the following parameters of the first dedicated resource in the following manners: change the reference signal associated with the first dedicated resource; lower the threshold value or information corresponding to the reference signal associated with the first dedicated resource; increase the number of preambles transmitted on the beam corresponding to the reference signal associated with the first dedicated resource; increase the maximum transmission power on the beam corresponding to the reference signal associated with the first dedicated resource; increase the number of reference signals (such as the SSB and/or the CSI-RS) associated with the RACH occasion of the first dedicated resource; extend the timer associated with the first event (such as the timer for limiting target cell access during handover).

According to implementations provided herein, for Immediate MDT scenarios, if handover occurs to the UE and target cell access fails with configured dedicated resource but succeeds with a common resource during handover, and handover failure is avoided, the terminal device will report the first information.

The above-mentioned technical solutions provide a mechanism for reporting abnormal events. It is an abnormal event that a UE fails to use a first dedicated resource for executing a first event but succeeds in using a first common resource for executing the first event. The UE reports at least one of information associated with the first dedicated resource and information associated with the first common resource to a network device, thus, the network device can be assisted in reconfiguring the first dedicated resource to reduce the probability of abnormal events.

Figure 11:
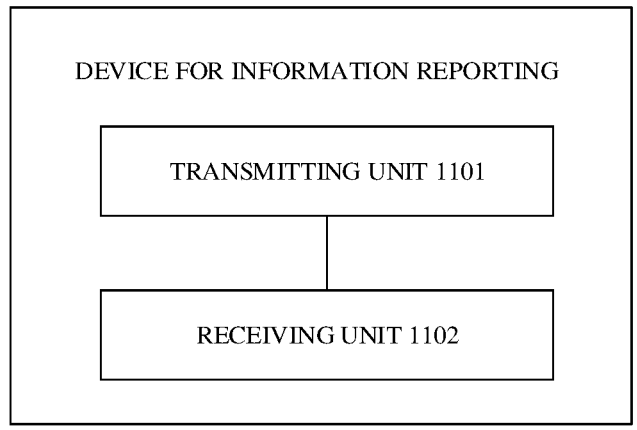
FIG. 11 is a schematic block diagram illustrating a device for information reporting according to implementations.

FIG. 11 is a schematic block diagram illustrating a device for information reporting according to implementations. As illustrated in FIG. 11, the device for information reporting includes a transmitting unit 1101. The transmitting unit 1101 can be implemented as a transmitter or transceiver, an antenna, or other means with a transmission function.

The transmitting unit 1101 is configured to transmit first information to a network device, where the first information includes information associated with a first dedicated resource and/or information associated with a first common resource. The first dedicated resource is a dedicated resource with which the terminal device executes a first event, and the first common resource is a common resource with which the UE executes the first event.

In one implementation, the information associated with the first dedicated resource includes at least one of the following: information of a target cell that fails to execute the first event with the first dedicated resource; an index of a reference signal associated with the first dedicated information; number of preambles transmitted on a beam corresponding to the reference signal associated with the first dedicated resource; maximum transmission power on the beam corresponding to the reference signal associated with the first dedicated resource; signal quality of the reference signal associated with the first dedicated resource; or first indication information indicative of whether the reference signal associated with the first dedicated resource belongs to an uplink carrier or a supplementary uplink carrier.

In one implementation, the information associated with the first common resource includes at least one of the following: information of a target cell that succeeds in executing the first event with the first common resource; an index of a reference signal associated with the first common resource; number of preambles transmitted on a beam corresponding to the reference signal associated with the first common resource; maximum transmission power on the beam corresponding to the reference signal associated with the first common resource; signal quality of the reference signal associated with the first common resource; or second indication information indicative of whether the reference signal associated with the first common resource belongs to an uplink carrier or a supplementary uplink carrier.

In one implementation, the signal quality includes at least one of RSRP, RSRQ, or an SINR.

In one implementation, the reference signal associated with the first dedicated resource includes at least one of an SSB or a CSI-RS.

In one implementation, the reference signal associated with the first common resource includes an SSB.

In one implementation, the first information further includes third indication information. The third indication information is indicative of number of occurrences of a second event, where the second event means that the UE fails to execute the first event with a dedicated resource and succeeds in executing the first event with a common resource.

In one implementation, the transmitting unit 1101 is configured to carry the third indication information in the first information on condition that the number of occurrences of the second event is greater than or equal to a first threshold.

In one implementation, the first event is a beam failure recovery event.

In one implementation, the device further includes a receiving unit 1102. The transmitting unit 1101 can be implemented as a receiver or transceiver, an antenna, or other means with a reception function. For instance, the receiving unit 1102 and the transmitting unit 1101 can be integrated into a transceiver. The receiving unit 1102 is configured to receive a RRC reconfiguration message or a UE information request message from the network device, where the RRC reconfiguration message or the UE information request message carries fourth indication information, and the fourth indication information is for instructing the UE to report the first information. The transmitting unit 1101 is configured to transmit a measurement report message or a UE information response message to the network device, wherein the measurement report message or the UE information response message carries the first information.

In one implementation, the transmitting unit 1101 is further configured to transmit fifth indication information to the network device, where the fifth indication information is for indicating that the UE stored the first information.

In one implementation, the fourth indication information is further indicative of a first threshold, and the transmitting unit is configured to carry the first information in the measurement report message or the UE information response message on condition that number of occurrences of a second event is greater than or equal to the first threshold, where the second event means that the UE fails to execute the first event with a dedicated resource and succeeds in executing the first event with a common resource.

In one implementation, the first event is a target cell access event during handover.

In one implementation, the transmitting unit 1101 is further configured to transmit a handover complete message to the network device, wherein the handover complete message carries fifth indication information, and the fifth indication information is for indicating that the UE stored the first information. The device further includes a receiving unit 1102. The receiving unit 1102 is configured to receive a RRC reconfiguration message or a UE information request message from the network device, wherein the RRC reconfiguration message or the UE information request message carries fourth indication information, and the fourth indication information is for instructing the UE to report the first information. The transmitting unit 1101 is configured to transmit a measurement report message or a terminal device information response message to the network device, where the measurement report message or the UE information response message carries the first information.

In one implementation, the transmitting unit 1101 is configured to transmit a handover complete message to the network device, where the handover complete message carries the first information.

In one implementation, the first information is used for the network device to reconfigure at least one of the following parameters of the first dedicated resource: a reference signal associated with the first dedicated resource; threshold information corresponding to the reference signal associated with the first dedicated resource; number of preambles transmitted on a beam corresponding to the reference signal associated with the first dedicated resource; maximum transmission power on the beam corresponding to the reference signal associated with the first dedicated resource; number of reference signals associated with a random access channel (RACH) occasion of the first dedicated resource; or a timer associated with the first event.

Those skilled in the art can understand that, related descriptions of the above-mentioned device for information reporting in this disclosure can make reference to related descriptions of the method for information reporting in this disclosure.

Figure 12:
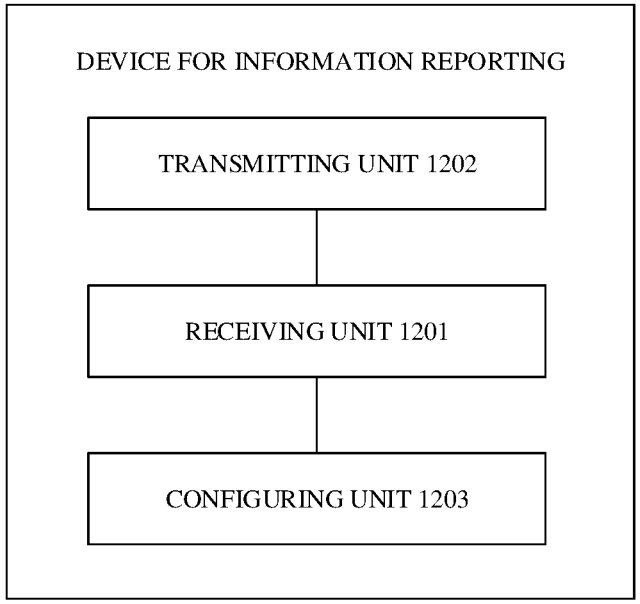
FIG. 12 is another schematic block diagram illustrating a device for information reporting according to implementations.

FIG. 12 is another schematic block diagram illustrating a device for information reporting according to implementations. As illustrated in FIG. 12, the device for information reporting includes a receiving unit 1201. The receiving unit 1201 can be implemented as a receiver or transceiver, antenna, or other means with a reception function.

The receiving unit 1201 is configured to receive first information from a UE, where the first information includes at least one of information associated with a first dedicated resource or information associated with a first common resource. The first dedicated resource is a dedicated resource with which the UE executes a first event, and the first common resource is a common resource with which the UE executes the first event.

In one implementation, the information associated with the first dedicated resource includes at least one of: information of a target cell that fails to execute the first event with the first dedicated resource; an index of a reference signal associated with the first dedicated information; number of preambles transmitted on a beam corresponding to the reference signal associated with the first dedicated resource; maximum transmission power on the beam corresponding to the reference signal associated with the first dedicated resource; signal quality of the reference signal associated with the first dedicated resource; or first indication information indicative of whether the reference signal associated with the first dedicated resource belongs to an uplink carrier or a supplementary uplink carrier.

In one implementation, the information associated with the first common resource includes at least one of: information of a target cell that succeeds in executing the first event with the first common resource; an index of a reference signal associated with the first common resource; number of preambles transmitted on a beam corresponding to the reference signal associated with the first common resource; maximum transmission power on the beam corresponding to the reference signal associated with the first common resource; signal quality of the reference signal associated with the first common resource; or second indication information indicative of whether the reference signal associated with the first common resource belongs to an uplink carrier or a supplementary uplink carrier.

In one implementation, the signal quality includes at least one of RSRP, RSRQ, or an SINR.

In one implementation, the reference signal associated with the first dedicated resource includes at least one of an SSB or a CSI-RS.

In one implementation, the reference signal associated with the first common resource includes an SSB.

In one implementation, the first information further includes third indication information. The third indication information is indicative of number of occurrences of a second event, where the second event means that the UE fails to execute the first event with a dedicated resource and succeeds in executing the first event with a common resource.

In one implementation, the third indication information is carried in the first information on condition that number of occurrences of the second event is greater than or equal to a first threshold.

In one implementation, the first event is a beam failure recovery event.

In one implementation, the device further includes a transmitting unit 1202. The transmitting unit 1202 can be implemented as a transmitter or transceiver, antenna, or other means with a transmission function. For instance, the receiving unit 1201 and the transmitting unit 1202 can be integrated into a transceiver. The transmitting unit 1202 is configured to transmit a RRC reconfiguration message or a UE information request message to the UE, where the RRC reconfiguration message or the UE information request message carries fourth indication information, and the fourth indication information is for instructing the UE to report the first information. The receiving unit 1201 is configured to receive a measurement report message or a UE information response message from the UE, where the measurement report message or the UE information response message carries the first information.

In one implementation, the receiving unit 1201 is configured to receive fifth indication information from the UE, where the fifth indication information is for indicating that the UE stored the first information.

In one implementation, the fourth indication information is further indicative of a first threshold, and the first information is carried in the measurement report message or the UE information response message by the UE on condition that number of occurrences of a second event is greater than or equal to the first threshold. The second event means that the UE fails to execute the first event with a dedicated resource and succeeds in executing the first event with a common resource.

In one implementation, the first event is a target cell access event during handover.

In one implementation, the receiving unit 1201 is configured to receive a handover complete message from the UE. The handover complete message carries fifth indication information, and the fifth indication information is for indicating that the UE stored the first information. The device further includes a transmitting unit 1202. The transmitting unit 1202 is configured to transmit a RRC reconfiguration message or a UE information request message to the UE. The RRC reconfiguration message or the UE information request message carries fourth indication information, and the fourth indication information is for instructing the UE to report the first information. The receiving unit 1201 is configured to receive a measurement report message or a UE information response message from the UE. The measurement report message or the UE information response message carries the first information.

In one implementation, the receiving unit 1201 is configured to receive a handover complete message from the UE, where the handover complete message carries the first information.

In one implementation, the device further includes a configuring unit 1203. The configuring unit 1203 is configured to reconfigure at least one of the following parameters of the first dedicated resource based on the first information: a reference signal associated with the first dedicated resource; threshold information corresponding to the reference signal associated with the first dedicated resource; number of preambles transmitted on a beam corresponding to the reference signal associated with the first dedicated resource; maximum transmission power on the beam corresponding to the reference signal associated with the first dedicated resource; number of reference signals associated with a random access channel (RACH) occasion of the first dedicated resource; or a timer associated with the first event.

Those skilled in the art can understand that, related descriptions of the above-mentioned device for information reporting in this disclosure can make reference to related descriptions of the method for information reporting in this disclosure.

Figure 13:
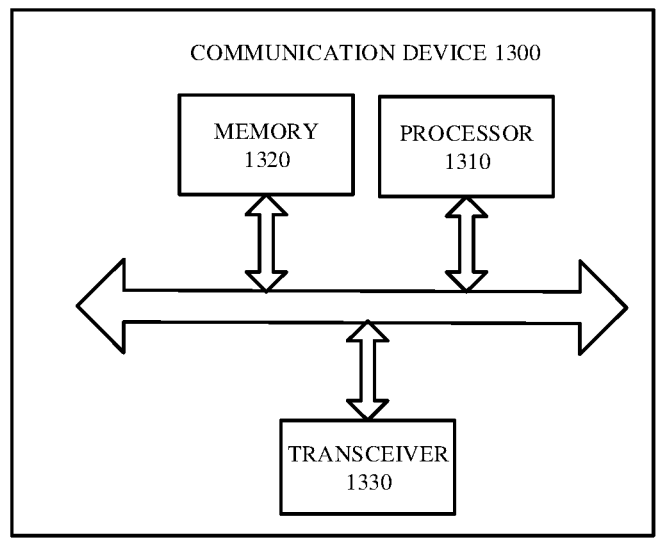
FIG. 13 is a schematic structural diagram illustrating a communication device according to implementations.

FIG. 13 is a schematic structural diagram illustrating a communication device 1300 according to implementations. The communication device may be a terminal device such as UE, or may be a network device. As illustrated in FIG. 13, the communication device 1300 includes a processor 1310. The processor 1310 is configured to invoke and run computer programs stored in a memory to implement the method provided in implementations.

As illustrated in FIG. 13, the communication device 1300 can further include a memory 1320. The processor 1310 is configured to invoke and run computer programs stored in the memory 1320 to implement the method provided in implementations.

The memory 1320 may be a separated device independent of the processor 1310, or may be integrated into the processor 1310.

As illustrated in FIG. 13, the communication device 1300 can further include a transceiver 1330. The processor 1310 can control the transceiver 1330 to communicate with other devices, for example, to transmit information or data to other devices, or receive information or data from other devices.

The transceiver 1330 may include a transmitter and a receiver. The transceiver 1330 may further include an antenna, where one or more antenna can be provided.

The communication device 1300 may be operable as the network device of implementations, and the communication device 1300 can implement the operations performed by the network device described in the foregoing method implementations, which will not be repeated herein for the sake of simplicity.

Alternatively, the communication device 1300 may be operable as the mobile terminal/the terminal device (UE) of implementations, and the communication device 1300 can implement the operations performed by the mobile terminal/the terminal device (UE) described in the foregoing method implementations, which will not be repeated herein for the sake of simplicity.

Figure 14:
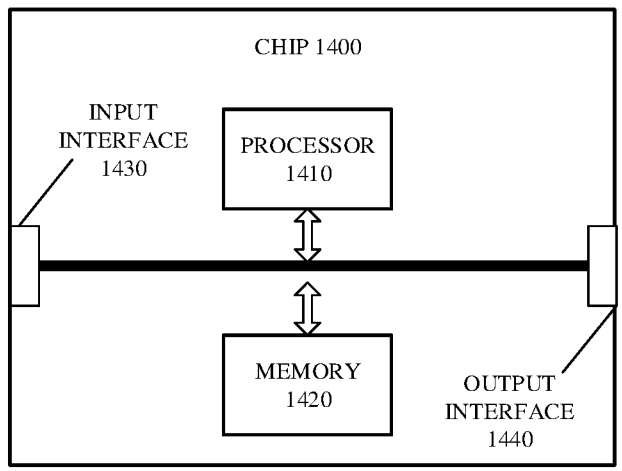
FIG. 14 is a schematic structural diagram illustrating a chip according to implementations.

FIG. 14 is a schematic structural diagram illustrating a chip according to implementations. As illustrated in FIG. 14, the chip 1400 includes a processor 1410. The processor 1410 is configured to invoke and run computer programs stored in a memory to implement the method provided in implementations.

As illustrated in FIG. 14, the chip 1400 may further include a memory 1420. The processor 1410 is configured to invoke and run computer programs stored in the memory 1420 to implement the method provided in implementations.

The memory 1420 may be a separated device independent of the processor 1410, or may be integrated into the processor 1410.

The chip 1400 may further include an input interface 1430. The processor 1410 can control the input interface 1430 to communicate with other devices or chips, for example, to acquire information or data transmitted by other devices or chips.

The chip 1400 may further include an output interface 1440. The processor 1410 can control the output interface 1440 to communicate with other devices or chips, for example, to output information or data to other devices or chips.

The chip is applicable to the network device of implementations. The chip can implement the operations performed by the network device described in the foregoing method implementations, which will not be repeated herein for the sake of simplicity.

Alternatively, the chip is applicable to the mobile terminal/the terminal device (UE) of implementations. The chip can implement the operations performed by the mobile terminal/the terminal device (UE) described in the foregoing method implementations, which will not be repeated herein for the sake of simplicity.

It can be understood that, the chip herein may also be referred to as a system-on-chip (SOC).

Figure 15:
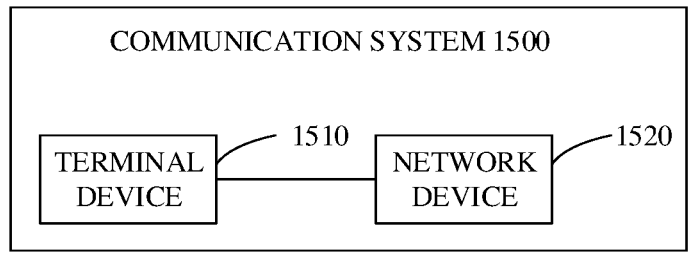
FIG. 15 is a schematic block diagram illustrating a communication system according to implementations.

FIG. 15 is a schematic block diagram illustrating a communication system 1500 according to implementations. As illustrated in FIG. 15, the communication system 1500 includes a terminal device 1510 and a network device 1520.

The terminal device 1510 can implement functions of the UE described in the foregoing method implementations, and the network device 1520 can implement functions of the network device described in the foregoing method implementations, which will not be repeated herein for the sake of simplicity.

It can be understood that, the processor referred to herein may be an integrated circuit chip with signal processing capabilities. During implementation, each step of the foregoing method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the above-mentioned method with the hardware thereof.

It can be understood that, the memory may be a volatile memory or a non-volatile memory, or may include both the volatile memory and the non-volatile memory. The non-volatile memory may be a ROM, a PROM, an erasable PROM (EPROM), an electrically EPROM (EEPROM), or a flash memory. The volatile memory can be a RAM that acts as an external cache. By way of example but not limitation, many forms of RAM are available, such as a static RAME (SRAM), a dynamic RAM (DRAM), a synchronous DRAM (SDRAM), a double data rate SDRAM (DDR SDRAM), an enhanced SDRAM (ESDRAM), a synchlink DRAM (SL-DRAM), and a direct rambus RAM (DR RAM). The memory of the system and the method described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, and so on. In other words, the memory of implementations is intended to include, but is not limited to, these and any other suitable types of memory.

Implementations further provide a computer readable storage medium. The computer readable storage medium is configured to store computer programs.

The computer readable storage medium is applicable to the network device of implementations. The computer programs are operable with a computer to implement the operations performed by the network device described in the foregoing method implementations, which will not be repeated herein for the sake of simplicity.

Alternatively, the computer readable storage medium is applicable to the mobile terminal/the terminal device (UE) of implementations. The computer programs are operable with a computer to implement the operations performed by the mobile terminal/the terminal device (UE) described in the foregoing method implementations, which will not be repeated herein for the sake of simplicity.

Implementations further provide a computer program product. The computer program product includes computer program instructions.

The computer program product is applicable to the network device of implementations. The computer program instructions are operable with a computer to implement the operations performed by the network device described in the foregoing method implementations, which will not be repeated herein for the sake of simplicity.

Alternatively, the computer program product is applicable to the mobile terminal/the terminal device (UE) of implementations. The computer program instructions are operable with a computer to implement the operations performed by the mobile terminal/the terminal device (UE) described in the foregoing method implementations, which will not be repeated herein for the sake of simplicity.

Implementations further provide a computer program.

The computer program is applicable to the network device of implementations. The computer program is operable with a computer to implement the operations performed by the network device described in the foregoing method implementations, which will not be repeated herein for the sake of simplicity.

The computer program is applicable to the mobile terminal/the terminal device (UE) of implementations. The computer program is operable with a computer to implement the operations performed by the mobile terminal/the terminal device (UE) described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above-mentioned method implementations, which will not be repeated herein.

It will be appreciated that the systems, apparatuses, and methods disclosed in implementations herein may also be implemented in various other manners. For example, the above-mentioned device implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the functions are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above-mentioned storage medium may include various kinds of media that can store program codes, such as a universal serial bus (USB) flash disk, a mobile hard drive, a ROM, a RAM, a magnetic disk, or an optical disk.

The above is only an implementation of the disclosure and is not intended to limit the scope of protection of the disclosure. Any modification, and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for information reporting, comprising:
transmitting, by a user equipment (UE), first information to a network device, the first information comprising at least one of: information associated with a first dedicated resource, or information associated with a first common resource, the first dedicated resource being a dedicated resource with which the UE executes a first event, and the first common resource being a common resource with which the UE executes the first event, wherein the first event comprises one of: a target cell access event during handover and a beam failure recovery event;
wherein the first information further comprises third indication information indicative of number of occurrences of a second event, wherein the second event means that the UE fails to execute the first event with a dedicated resource and succeeds in executing the first event with a common resource.

2. The method of claim 1, wherein the information associated with the first dedicated resource comprises at least one of:
information of a target cell that fails to execute the first event with the first dedicated resource;
an index of a reference signal associated with the first dedicated information;
number of preambles transmitted on a beam corresponding to the reference signal associated with the first dedicated resource;
maximum transmission power on the beam corresponding to the reference signal associated with the first dedicated resource;
signal quality of the reference signal associated with the first dedicated resource; or
first indication information indicative of whether the reference signal associated with the first dedicated resource belongs to an uplink carrier or a supplementary uplink carrier.

3. The method of claim 1, wherein the information associated with the first common resource comprises at least one of:
information of a target cell that succeeds in executing the first event with the first common resource;
an index of a reference signal associated with the first common resource;
number of preambles transmitted on a beam corresponding to the reference signal associated with the first common resource;
maximum transmission power on the beam corresponding to the reference signal associated with the first common resource;
signal quality of the reference signal associated with the first common resource; or
second indication information indicative of whether the reference signal associated with the first common resource belongs to an uplink carrier or a supplementary uplink carrier.

4. The method of claim 1, wherein the third indication information is carried in the first information by the UE on condition that number of occurrences of the second event is greater than or equal to a first threshold.

5. The method of claim 1, wherein the first event is the beam failure recovery event, and transmitting, by the UE, the first information to the network device comprises:
receiving, by the UE, a radio resource control (RRC) reconfiguration message or a UE information request message from a network device, wherein the RRC reconfiguration message or the UE information request message carries fourth indication information, and the fourth indication information is for instructing the UE to report the first information; and
transmitting, by the UE, a measurement report message or a UE information response message, wherein the measurement report message or the UE information response message carries the first information.

6. The method of claim 5, further comprising:
transmitting, by the UE, fifth indication information to the network device, wherein the fifth indication information is for indicating that the UE stored the first information.

7. The method of claim 5, wherein the fourth indication information is further indicative of a first threshold, and the first information is carried in the measurement report message or the UE information response message by the UE on condition that number of occurrences of a second event is greater than or equal to the first threshold, wherein the second event means that the UE fails to execute the first event with a dedicated resource and succeeds in executing the first event with a common resource.

8. The method of claim 7, wherein transmitting, by the UE, the first information to the network device comprises:
transmitting, by the UE, a handover complete message to the network device, wherein the handover complete message carries the first information.

9. The method of claim 1, wherein the first event is the target cell access event during handover, and transmitting, by the UE, the first information to the network device comprises:
transmitting, by the UE, a handover complete message to the network device, wherein the handover complete message carries fifth indication information, and the fifth indication information is for indicating that the UE stored the first information;
receiving, by the UE, a RRC reconfiguration message or a UE information request message from the network device, wherein the RRC reconfiguration message or the UE information request message carries fourth indication information, and the fourth indication information is for instructing the UE to report the first information; and
transmitting, by the UE, a measurement report message or a UE information response message to the network device, wherein the measurement report message or the UE information response message carries the first information.

10. A method for information reporting, comprising:
receiving, by a network device, first information from a UE, the first information comprising at least one of: information associated with a first dedicated resource, or information associated with a first common resource, the first dedicated resource being a dedicated resource with which the UE executes a first event, and the first common resource being a common resource with which the UE executes the first event, wherein the first event comprises one of: a target cell access event during handover and a beam failure recovery event;
wherein the first event is the target cell access event during handover, and receiving, by the network device, the first information from the UE comprises:
receiving, by the network device, a handover complete message from the UE, wherein the handover complete message carries fifth indication information, and the fifth indication information is for indicating that the UE stored the first information;

transmitting, by the network device, a RRC reconfiguration message or a UE information request message to the UE, wherein the RRC reconfiguration message or the UE information request message carries fourth indication information, and the fourth indication information is for instructing the UE to report the first information; and receiving, by the UE, a measurement report message or a UE information response message from the UE, wherein the measurement report message or the UE information response message carries the first information.

11. The method of claim 10, wherein the first event is the beam failure recovery event, and receiving, by the network device, the first information from the UE comprises:

transmitting, by the network device, a RRC reconfiguration message or a UE information request message to the UE, wherein the RRC reconfiguration message or the UE information request message carries fourth indication information, and the fourth indication information is for instructing the UE to report the first information; and receiving, by the network device, a measurement report message or a UE information response message from the UE, wherein the measurement report message or the UE information response message carries the first information.

12. The method of claim 10, further comprising:

reconfiguring, by the network device, at least one of the following parameters of the first dedicated resource based on the first information:
  a reference signal associated with the first dedicated resource;
  threshold information corresponding to the reference signal associated with the first dedicated resource;
  number of preambles transmitted on a beam corresponding to the reference signal associated with the first dedicated resource;
  maximum transmission power on the beam corresponding to the reference signal associated with the first dedicated resource;
  number of reference signals associated with a random access channel (RACH) occasion of the first dedicated resource; or
  a timer associated with the first event.

13. A device for information reporting, comprising:
a transceiver;
a memory configured to store computer programs; and
a processor configured to invoke and run the computer programs stored in the memory to cause the transceiver to:
transmit first information to a network device, the first information comprising at least one of: information associated with a first dedicated resource, or information associated with a first common resource, the first dedicated resource being a dedicated resource with which a UE executes a first event, and the first common resource being a common resource with which the UE executes the first event, wherein the first event comprises one of: a target cell access event during handover and a beam failure recovery event;

wherein the first event is the target cell access event during handover, and the transceiver is further configured to:

transmit a handover complete message to the network device, wherein the handover complete message carries fifth indication information, and the fifth indication information is for indicating that the UE stored the first information;

receive a RRC reconfiguration message or a UE information request message from the network device, wherein the RRC reconfiguration message or the UE information request message carries fourth indication information, and the fourth indication information is for instructing the UE to report the first information; and transmit a measurement report message or a UE information response message to the network device, wherein the measurement report message or the UE information response message carries the first information.

14. The device of claim 13, wherein the first event is the beam failure recovery event, and the transceiver is further configured to:

receive a RRC reconfiguration message or a UE information request message from a network device, wherein the RRC reconfiguration message or the UE information request message carries fourth indication information, and the fourth indication information is for instructing the UE to report the first information, and transmit a measurement report message or a UE information response message to the network device, wherein the measurement report message or the UE information response message carries the first information.

15. A device for information reporting, comprising:
a transceiver;
a memory configured to store computer programs; and
a processor configured to invoke and run the computer programs stored in the memory to cause the transceiver to:
receive first information from a UE, the first information comprising at least one of: information associated with a first dedicated resource, or information associated with a first common resource, the first dedicated resource being a dedicated resource with which the UE executes a first event, and the first common resource being a common resource with which the UE executes the first event, wherein the first event comprises one of: a target cell access event during handover and a beam failure recovery event;

wherein the first event is the target cell access event during handover, and the transceiver is further configured to:

receive a handover complete message from the UE, wherein the handover complete message carries fifth indication information, and the fifth indication information is for indicating that the UE stored the first information;

transmit a RRC reconfiguration message or a UE information request message to the UE, wherein the RRC reconfiguration message or the UE information request message carries fourth indication information, and the fourth indication information is for instructing the UE to report the first information; and receive a measurement report message or a UE information response message from the UE, wherein the measurement report message or the UE information response message carries the first information.

16. The device of claim 15, wherein the first event is the beam failure recovery event, and the transceiver is further configured to:

transmit a RRC reconfiguration message or a UE information request message to the UE, wherein the RRC reconfiguration message or the UE information request message carries fourth indication information, and the fourth indication information is for instructing the UE to report the first information; and receive a measurement report message or a UE information response message from the UE, wherein the measurement report message or the UE information response message carries the first information.

\* \* \* \* \*